Jan. 24, 1939.   A. A. THOMAS   2,144,820
DOUBLE-WALLED VACUUM RECEPTACLE
Filed Sept. 5, 1936
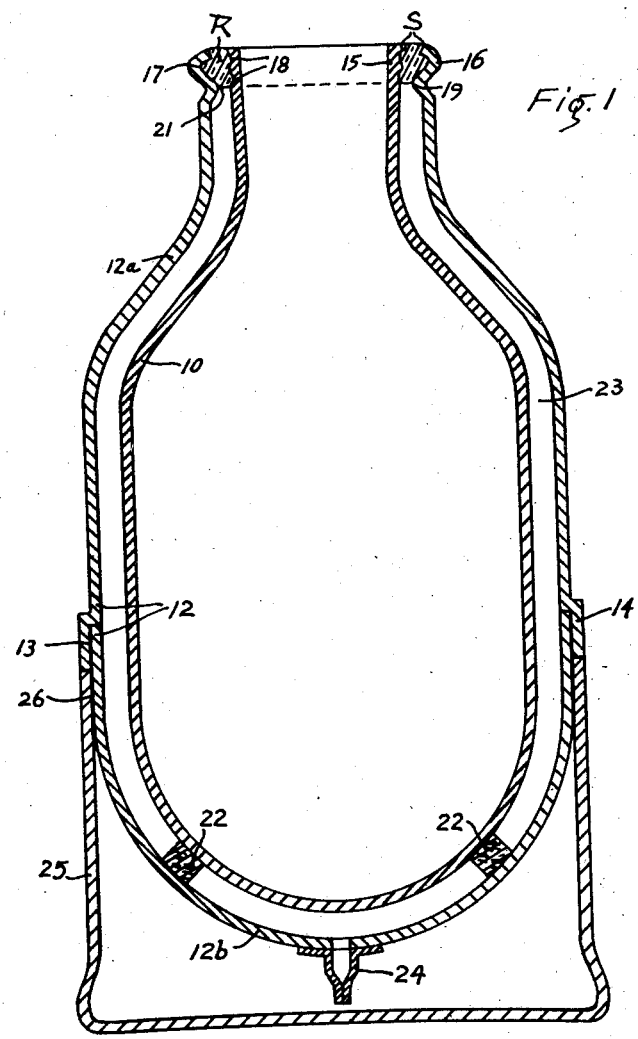
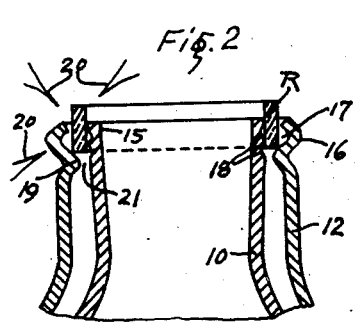
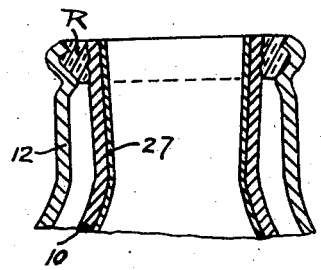
INVENTOR
Adolph A. Thomas Patented Jan. 24, 1939

2,144,820

UNITED STATES PATENT OFFICE 2,144,820

DOUBLE-WALLED VACUUM RECEPTACLE

Adolph A. Thomas, New York, N. Y., assignor to The American Thermos Bottle Company, Norwich, Conn., a corporation of Ohio Application September 5, 1936, Serial No. 99,546

4 Claims. (Cl. 220—10)

My invention relates to heat-insulated receptacles, and its object is to provide a new and improved construction of double-walled vacuum bottle or like container having certain practical advantages over prior devices of that kind. Briefly stated, my new bottle comprises a pair of spaced nested cylinders of metal welded together at the top by a strong glass seal, so that the inner cylinder (the container proper) is effectively heat-insulated from the outer metal cylinder, which forms at least a portion of the outer casing. This double-walled metal bottle is unbreakable, has good heat-insulating efficiency, and can be made at a comparatively low cost.

Double-walled vacuum bottles of glass, known for many years, are inherently weak on account of the fragile walls of the glass cylinders or fillers, which break easily unless the bottle is carefully handled, and even then the glass is liable to shatter without warning due to unequal strains in the thin glass walls of the filler. There is also a certain amount of breakage in handling the glass cylinders at the factory and that increases the cost of the product. These double-walled glass fillers must be carefully mounted in an outer protective casing, usually of metal, and that is an item of considerable expense. As the vacuum bottle business is highly competitive, anything that increases the cost of the bottle even a little is a distinct disadvantage to the manufacturer.

It has heretofore been proposed to make vacuum bottles with double-walled fillers of metal, but such fillers had a direct metal connection between the two nested cylinders, so that the filler consisted of a continuous heat-conducting metal wall from the inner to the outer cylinder. In other words, the inner metal container was not heat-insulated from the surrounding metal cylinder, so that the heat-insulating properties of the bottle were greatly reduced,—so much so, in fact, that it was found necessary to fill the space between the cylinders with heat-insulating material like silica, powdered charcoal or granulated cork. To evacuate the space filled with this comminuted material presented an additional problem and necessitated the provision of special devices to prevent the material from being sucked into the vacuum apparatus. As a result, those prior metal vacuum bottles were not only more expensive to make than the glass bottles but were less efficient as heat-insulators.

It is the purpose of this invention to overcome the above and other objections and drawbacks of prior vacuum bottles by producing an all-metal double-walled bottle which has the three-fold advantage of effective heat-insulation, cheapness of manufacture, and (from the user's standpoint) being unbreakable even under rough or careless treatment and therefore always safe to use. The novel features and practical advantages of my new bottle will be clear from a description of the accompanying drawing, in which Fig. 1 represents a vertical section of a metal vacuum bottle embodying my invention;

Fig. 2 is a fragmentary view showing how the glass sealing ring is positioned between the nested metal cylinders for the sealing operation; and Fig. 3 shows a bottle in which the inner metal cylinder is provided with a lining, this view being fragmentary for lack of space.

The double-walled unit of my vacuum bottle consists of an inner metal cylinder 10 and an outer metal cylinder 12, the latter in this instance being made in two sections 12a—12b welded together along the wide contact area 13 in a strong vacuum-tight joint which makes the sections substantially integral. The upper section 12a preferably ends in an off-set flange 14 which forms a recess for receiving the upper end of the lower section 12b, so that the welded sections present a smooth unbroken inner surface as if the cylinder 12 were in one piece. The only purpose of making the outer cylinder 12 in two sections in the particular form of bottle shown is to permit insertion of the inner cylinder 10 through the open base end of the upper section 12a before the lower section 12b is welded in place. In wide-mouthed containers where the cylinders 10—12 are straight up and down, so that the inner one can be inserted through the top of the outer one, the latter may be in one piece like the inner cylinder. These cylinders may be spun or otherwise shaped of suitable sheet metal, such as steel, nickel, aluminum, duralumin, and various alloys. The inner cylinder 10 may also be made of a low expansion alloy of iron and nickel, one form of which is known in the trade as Invar.

The nested metal cylinders 10—12 are integrally sealed together by a glass ring R which fills the annular space S between the adjacent rims 15 and 16 of the cylinders. The rim 16 of the outer cylinder 12 flares outwardly to provide an inner groove 17, and the outer wall of rim 15 of cylinder 10 is preferably formed with a grooved or roughened surface 18, which forms with groove 17 an annular space of irregular cross-section and wider at the top than at the bottom. When this grooved space S between the nested cylinder rims 15—16 becomes filled with the fused glass of sealing ring R, the cylinders are not only welded together but mechanically locked against axial displacement. Fig. 2 shows how simple it is to make the weld between the two cylinders: the glass ring R (cut from a long tube) is placed in the space S, the bottom edge of the ring resting on the inner shoulder 19 of cylinder 12. When heat is applied to the sealing ring R, as by properly arranged gas jets 20, the glass melts down into the annular space S and completely fills it, the plastic glass adhering to the hot metal surfaces of the cylinder rims in a strong vacuum-tight weld. It goes without saying that the nested cylinders are slowly rotated during the sealing operation for uniform heating of the glass ring and the rims 15—16. The restricted annular opening or slot 21 formed by shoulder 19 at the bottom of the sealing space S prevents the plastic glass from dropping out. The width and thickness of the sealing ring R are so chosen that the fused glass completely fills the space S, as shown in Figs. 1 and 3, so that the top of the glass seal is substantially flush with the tops of the cylinders 10—12.

The glass of sealing ring R should have the same (or about the same) coefficient of expansion as the metal of cylinder 10, so that the weld between those two parts can not loosen under any temperature changes however great or sudden. In some cases I may use a low expansion metal of the type of Invar for the inner cylinder 10, and a low expansion glass of the type of Pyrex glass or Solex glass for the sealing ring R, the expansion coefficient of the mentioned materials being less than 0.000004. It is a simple matter to select a glass for ring R and a metal or alloy for cylinder 10 with practically the same coefficient of expansion. Since Pyrex glass and Solex glass (both boro-silicate glasses) are practically unaffected by changes of temperature and can therefore be made thick enough (say, ⅛ of an inch for ordinary bottles) to withstand severe handling, I include within the range of my invention the idea of making the inner cylinder or container 10 of either of said types of glass, which would be practically as unbreakable as metal. In the old glass fillers, made of the conventional high-expansion glass, the cylinder walls have to be blown very thin to prevent their breaking under sudden temperature changes, and so those fillers are necessarily very weak mechanically. According to my invention, by using a low expansion glass for cylinder 10, the latter can be made as thick as required to give it the strength of metal without danger of cracking under sudden severe changes of temperature.

I wish to say a few words regarding a special advantage obtained by making the inner cylinder 10 of Solex glass, which is a commercial product readily procurable in the market. This glass is an iron glass with an expansion coefficient as low as 0.000003, and it possesses the property of absorbing, to a marked degree, heat radiation both in the short and long wave portions of the spectrum. Therefore, radiant energy emanating from the hot contents of cylinder 10 can not pass through the heat-absorbing walls thereof, whereby the heat-insulating efficiency of the bottle is increased without the need of silvering the outer wall of the container, as required in the prior fillers of ordinary glass. This absence of the need of silvering the Solex glass cylinder 10 eliminates a point of expense. Solex glass being dark green is not clearly transparent and does not expose to view the inside of the metal cylinder 12.

The vitreous seal R between the rims of cylinders 10—12 is sufficiently wide and deep to constitute a strong bond which not only supports the inner container 10 but effectively heat-insulates it from the metal of the outer cylinder 12. To relieve the glass seal R of undue strains, shock-absorbing pads 22 of cork, asbestos or the like, are placed between the rounded bottom portions of the nested cylinders and preferably in pressure contact therewith. The space 23 between the cylinders is exhausted through a metal tube 24 attached to the bottom of cylinder 12, and it is not necessary to fill this space with heat-insulating material, because the insulation of the container 10 from the metal of the outer cylinder 12 through the vitreous seal R makes the exhausting of space 23 sufficiently effective to heat-insulate the contents of the container.

After the space 23 has been exhausted to the desired degree and the tube 24 sealed off, the cup-shaped base member 25 is attached to the outer cylinder 12 in any practical way, as by screwing, welding, brazing, or soldering the parts together along the contact surface 26, and after that the entire exterior of the bottle may be electroplated or otherwise covered with a suitable coating. The top rim of base member 25 preferably abuts against the lower edge of flange 14 on cylinder 12, so that the base member forms a continuation of the flange and improves the appearance of the bottle. The base member 25 will usually be made of sheet metal, but other suitable material may be used, such as a condensation product.

No separate casing is necessary for this metal bottle, because the upper section 12a of cylinder 12 and the base member 25 constitute an outer metal casing which fully protects the heat-insulated inner container 10. If the latter is of a metal which is not wholly neutral to foods and liquids, it may be covered with a suitable lining 27, as indicated in Fig. 3, and this lining may be an electroplating (as of chromium, nickel, etc.) or a vitreous enamel unaffected by the contents of the bottle. It is also possible to blow a lining of glass against the metal container 10, the glass having the same expansion coefficient as the metal. That is to say, using the metal cylinder 10 as a mold, the glass is blown against it to form the lining 27, which unites with the hot metal over its entire surface in a uniform sealing contact, so that the metal and the glass become in effect an integral structure. A good combination of materials for the parts 10 and 27 would be an iron-nickel alloy like Invar for container 10 and Pyrex or Solex glass (or an equivalent low expansion glass) for the lining 27.

It will be clear from the preceding description that I have provided a double-walled vacuum bottle which has a minimum of parts cheap to make and easy to assemble, which possesses efficiency in heat-insulation, and is free from the danger of breaking. While the metal cylinders 10—12 are in themselves more expensive than the old glass fillers, the fact that the metal cylinders involve no breakage and require no extra casing makes the average total cost of this metal bottle less than that of the prior glass bottles. This comparison also applies when the inner cylinder 10 is molded of a thick low-expansion glass like Pyrex, which is practically as unbreakable as metal for the purpose required.

The outer cylinder 12 and base member 25 will usually be of sheet steel on account of its strength and cheapness, but these parts may also be made of aluminum (pure or alloyed) which is not only strong but light in weight. The inner cylinder 10 may consist of or be plated with nickel, which has a lower coefficient of expansion than either steel or aluminum, and has a much lower heat conductivity than aluminum. Nickel has the further advantage of being permanent in air, easy to keep bright, and neutral to the contents of the bottle.

It is usual in bottles of this kind to provide the outer casing with screwthreads for holding a combined cap and cup, but that expedient is so well known that I have not deemed it necessary to show a cap screwed on to the breast section of the outer cylinder 12, as would be done to complete the bottle for the market.

Although I have shown and described a specific form and construction of bottle, I would have it understood that my invention is not limited to the details set forth, for various changes and modifications are possible within the scope of the appended claims. I use the term "bottle" not in a restrictive meaning but broadly to include any practical shape of double-walled vacuum receptacle. It is hardly necessary to add that the accompanying drawings were not made with the mathematical accuracy required in shop drawings, and are to be considered merely in an illustrative sense. I have purposely exaggerated the relative dimensions of the parts for the sake of clearness.

I claim as my invention:

1. A double-walled vacuum bottle having a pair of spaced nested cylinders of which the outer one is metal, the top rims of said cylinders being separated to provide an annular sealing space of irregular cross-section filled with a fused glass ring which rigidly welds the cylinders together and heat-insulates the inner cylinder from the outer metal cylinder, the irregular cross-section of the fused sealing ring forming means for mechanically locking the united cylinders against relative axial displacement.

2. A double-walled vacuum bottle having a pair of spaced nested cylinders, the top rims of said cylinders being separated and shaped to provide an annular space wider at the top than at the bottom, and a sealing ring of glass filling said space and fused on opposite sides to the cylinder rims, whereby the cylinders are integrally united by a strong heat-insulating weld, the restricted bottom opening of said annular space retaining the plastic glass during the sealing operation.

3. A double-walled vacuum bottle having a pair of spaced nested cylinders, the top rims of said cylinders being separated by an annular space, and a sealing ring of glass filling said space and fused to the cylinder rims, the opposing cylinder walls forming said anular space being provided with grooves or recesses which are filled with the fused glass of the sealing ring and thereby mechanically lock the united cylinders against relative axial displacement, so that the inner cylinder is firmly supported by the glass sealing ring.

4. A double-walled vacuum bottle having a pair of spaced nested cylinders, the top rims of said cylinders being separated and shaped to provide an annular space wider at the top than at the bottom, and a sealing ring of glass filling said space and fused to the cylinder rims, whereby the cylinders are integrally united by a strong heat-insulating weld, the restricted bottom opening of said annular space retaining the plastic glass during the sealing operation, the opposing cylinder walls forming said annular space being provided with grooves or recesses which are filled with fused sealing glass and thereby mechanically lock the united cylinders against relative axial displacement, so that the inner cylinder is firmly supported by the glass sealing ring.

ADOLPH A. THOMAS.